United States Patent
Scheglmann et al.

(10) Patent No.: US 6,772,935 B2
(45) Date of Patent: Aug. 10, 2004

(54) METHOD AND DEVICE FOR FRICTION STIR WELDING WITH SIMULTANEOUS COOLING

(75) Inventors: Gerhard Scheglmann, Ruhpolding (DE); Frank Palm, Munich (DE); Klaus Raether, Hoehenkirchen (DE)

(73) Assignee: EADS Deutschland GmbH, Ottobrunn (DE)

( * ) Notice: Subject to any disclaimer, the term of this patent is extended or adjusted under 35 U.S.C. 154(b) by 0 days.

(21) Appl. No.: 10/333,291

(22) PCT Filed: Jul. 19, 2001

(86) PCT No.: PCT/EP01/08344
§ 371 (c)(1),
(2), (4) Date: Jan. 17, 2003

(87) PCT Pub. No.: WO02/07923
PCT Pub. Date: Jan. 31, 2002

(65) Prior Publication Data
US 2003/0111515 A1 Jun. 19, 2003

(30) Foreign Application Priority Data
Jul. 20, 2000 (DE) .......................................... 100 35 332

(51) Int. Cl.$^7$ ........................ B23K 20/12; B23K 37/00; B23K 5/22; B23K 28/00
(52) U.S. Cl. ..................... 228/112.1; 228/200; 228/2.1; 228/46
(58) Field of Search ............................. 228/112.1, 114, 228/200, 2.1, 2.3, 46; 156/73.5

(56) References Cited

U.S. PATENT DOCUMENTS

| | | | |
|---|---|---|---|
| 3,948,428 A | 4/1976 | Bonomo et al. ............... 228/46 |
| 5,460,317 A | 10/1995 | Thomas et al. ........... 228/112.1 |
| 5,794,835 A | * 8/1998 | Colligan et al. .............. 228/2.1 |
| 5,829,664 A | * 11/1998 | Spinella et al. ........... 228/112.1 |
| 6,311,889 B1 | * 11/2001 | Ezumi et al. ............. 228/112.1 |
| 6,464,127 B2 | * 10/2002 | Litwinski et al. ......... 228/112.1 |
| 6,484,924 B1 | * 11/2002 | Forrest ..................... 228/112.1 |
| 6,516,992 B1 | * 2/2003 | Colligan ................... 228/112.1 |
| 6,585,148 B2 | * 7/2003 | Aono et al. ............... 228/112.1 |
| 6,637,109 B2 | * 10/2003 | Nyqvist ................... 29/890.03 |
| 6,648,206 B2 | * 11/2003 | Nelson et al. ............ 228/112.1 |

FOREIGN PATENT DOCUMENTS

DE 19830550 1/2000
EP 0810056 12/1998

(List continued on next page.)

*Primary Examiner*—Steven Bos
*Assistant Examiner*—Colleen P. Cooke
(74) *Attorney, Agent, or Firm*—Davidson, Davidson & Kappel, LLC

(57) ABSTRACT

A method for friction stir welding using liquid cooling. The method includes the steps of moving a pin tool across a welding location, spraying a cooling liquid in a localized manner from a cooling ring moving with the pin tool onto a trailing region and onto lateral regions of the welding location adjacent to the pin tool, and blowing cooling gas from a gas jet moving with the pin tool from a front of the pin tool against the pin tool and against the cooling liquid emerging from the cooling ring. In addition, a friction stir welding and cooling device includes a pin tool configured to move across a welding location and a cooling ring at least partially encircling the pin tool. The cooling ring is configured to move simultaneously with the pin tool across the welding location and includes a plurality of nozzles configured to spray a cooling liquid. The nozzles are arranged such that the cooling liquid emerging from the nozzles is localized at a trailing region and at lateral regions of the welding location adjacent the pin tool.

9 Claims, 2 Drawing Sheets

FOREIGN PATENT DOCUMENTS

| | | | |
|---|---|---|---|
| JP | 10225781 | | 8/1998 |
| JP | 11104860 | | 4/1999 |
| JP | 02001205459 A | * | 7/2001 |
| JP | 02002028792 A | * | 1/2002 |
| JP | 02002153977 A | * | 5/2002 |
| JP | 02002153981 A | * | 5/2002 |
| JP | 02002248583 A | * | 9/2002 |
| JP | 02003094176 A | * | 4/2003 |
| JP | 02003154470 A | * | 5/2003 |
| WO | 9310935 | | 6/1993 |

* cited by examiner

METHOD AND DEVICE FOR FRICTION STIR WELDING WITH SIMULTANEOUS COOLING

BACKGROUND

The present invention relates to a method for friction stir welding using liquid cooling.

In the friction stir welding process (FSW process), the cooling of the materials to be joined is accomplished in a known manner in that the welding process is carried out completely under water. This method in particular has the disadvantage that Al/Mg alloys cannot be welded with good quality because of the high oxygen affinity and the oxygen contained in the cooling water. Moreover, in this cooling technology, the cooling water removes too much heat from the process so that it cannot be guaranteed that the materials to be joined are sufficiently plasticized. Therefore, it is possible for defects, such as pores, to occur in the weld seam because of insufficient material transport, preventing the production of a technically perfect weld seam.

However, the possibility of cooled friction stir welding of Al/Mg alloys would be of great economic importance, in particular with regard to the joining of large-surface metal sheets as occurs in aircraft construction.

Another disadvantage of the known method is that in an uncooled process, considerable distortion arises, which may result in an aftertreatment of the welded objects.

SUMMARY OF THE INVENTION

An object of the present invention is to provide a method for friction stir welding which allows welding of alloys having a high oxygen affinity and/or generation of a large amount of plasticization energy and permits easy control of the heat flux from the welding location.

The present invention provides a method for friction stir welding using liquid cooling. The method includes the steps of moving a pin tool across a welding location, spraying a cooling liquid in a localized manner from a cooling ring moving with the pin tool onto a trailing region and onto lateral regions of the welding location adjacent to the pin tool, and blowing cooling gas from a gas jet moving with the pin tool from a front of the pin tool against the pin tool and against the cooling liquid emerging from the cooling ring. In addition, the present invention provides a friction stir welding and cooling device that includes a pin tool configured to move across a welding location and a cooling ring at least partially encircling the pin tool. The cooling ring is configured to move simultaneously with the pin tool across the welding location and includes a plurality of nozzles configured to spray a cooling liquid. The nozzles are arranged such that the cooling liquid emerging from the nozzles is localized at a trailing region and at lateral regions of the welding location adjacent the pin tool.

The method according to the present invention advantageously uses a combined gas and water cooling in which the water supply to the pin tool is limited to the trailing region and the lateral regions of the pin tool, and the possible formation of a water film at the front side of the pin tool, at which the open welding location is situated, is prevented by the gas flow acting from the front.

In this context, the method according to the present invention is not limited to a specific position of the weld seam and can also be used for making horizontal weld seams.

Moreover, by adjusting the gas and water flows relative to each other, the combined gas and water cooling allows easy control of the heat flux from the welding location, thus allowing the strength in the weld seam to be adjusted in a controlled manner and the reduction in strength ("local strength drop"), which usually arises in the heat-affected zone (HAZ), to be reduced in that heat is permitted where it is required for the process and dissipated where it is detrimental to the process.

A further advantage of the cooling according to the present invention can be seen in the possibility of combining the friction stir welding with a preceding laser beam, arc or flame heating, which is not possible when cooling in a water bath.

Moreover, it is possible to carry out a combined welding process for materials that are difficult to deform, the combined welding process consisting of the cooled friction stir welding process according to the present invention and a preceding laser beam welding process.

BRIEF DESCRIPTION OF THE DRAWINGS

In the following, an exemplary embodiment of the present invention will be explained in greater detail with reference to the drawings, in which.

DETAILED DESCRIPTION

Figure 1:
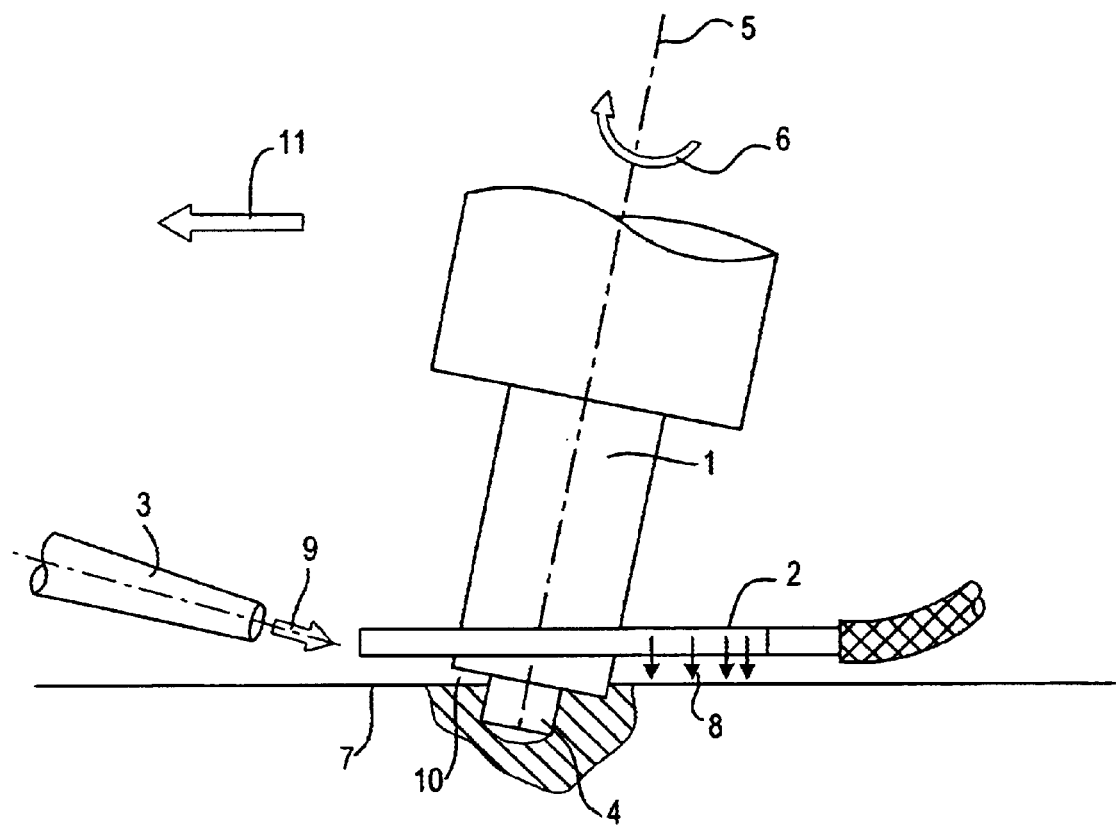
FIG. 1 shows a method according to the present invention for friction stir welding.

In the method for friction stir welding shown in FIG. 1, a pin tool 1 is cooled with water by a cooling ring 2 simultaneously moving in the feed direction and with air by a gas jet 3 simultaneously moving in the feed direction.

Pin tool 1, while rotating about its longitudinal axis 5 according to rotation arrow 6, is rubbingly plunged with its pin 4 into the surface of the component 7 to be welded, and is moved along the welding joint in the sense of direction arrow 11, maintaining the rotation. Longitudinal axis 5 of pin tool 1 is somewhat titled back from the vertical in a direction opposite to the feed direction.

The movements of pin tool 1 described above and the inclination of longitudinal axis 5 are known features of the friction stir welding method.

Cooling ring 2 and gas jet 3 are rigidly connected to the feed carriage of pin tool 1 via adjustable holding devices. In FIG. 1, the feed carriage and the holding devices are not shown for reasons of graphical simplification.

In the trailing region and the adjacent lateral regions of pin tool 1, cooling water emerges from simultaneously moving cooling ring 2 in accordance with the direction arrows 8 shown. Simultaneously moving gas jet 3 blows cooling air from the front against pin tool 1 and against the cooling water emerging from cooling ring 2, in accordance with the direction arrow 9 shown.

In addition to the resulting cooling effect, the blowing of cooling air against the cooling water also prevents the cooling water from penetrating into wedge-shaped gap 10 between tilted back pin tool 1 and component 7 because of capillary effects, thus supporting the intention of the inventive solution to keep the abraded and heated material of the welding location free of cooling water. In this manner, the abraded welding material can be prevented from corrosion with the oxygen of the water.

Figure 2:
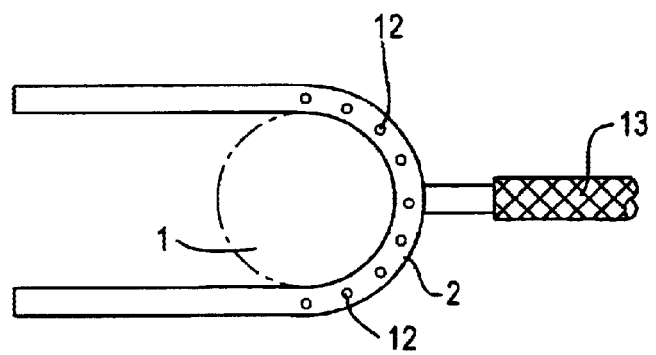
FIG. 2 is a bottom view of a cooling ring for the water cooling.

FIG. 2 shows cooling ring 2 in a bottom view, i.e., looking at the ring surface which is associated with component 7 and in which are arranged individual nozzles 12 for exit of the cooling water. The cooling water is fed to cooling ring 2 through a hose 13.

In the exemplary embodiment, for example, cooling ring 2 is not formed as a closed ring lying around pin tool 1 but opens toward gas jet 3 in the shape of a U, as a result of which the cooling air coming from the front can flow toward pin 1, unhindered by cooling ring 2.

The array of water nozzles 11 is limited to the rear region of the cooling ring so that only the trailing regions and the regions lateral to the pin tool are wetted with cooling water.

Figure 3:
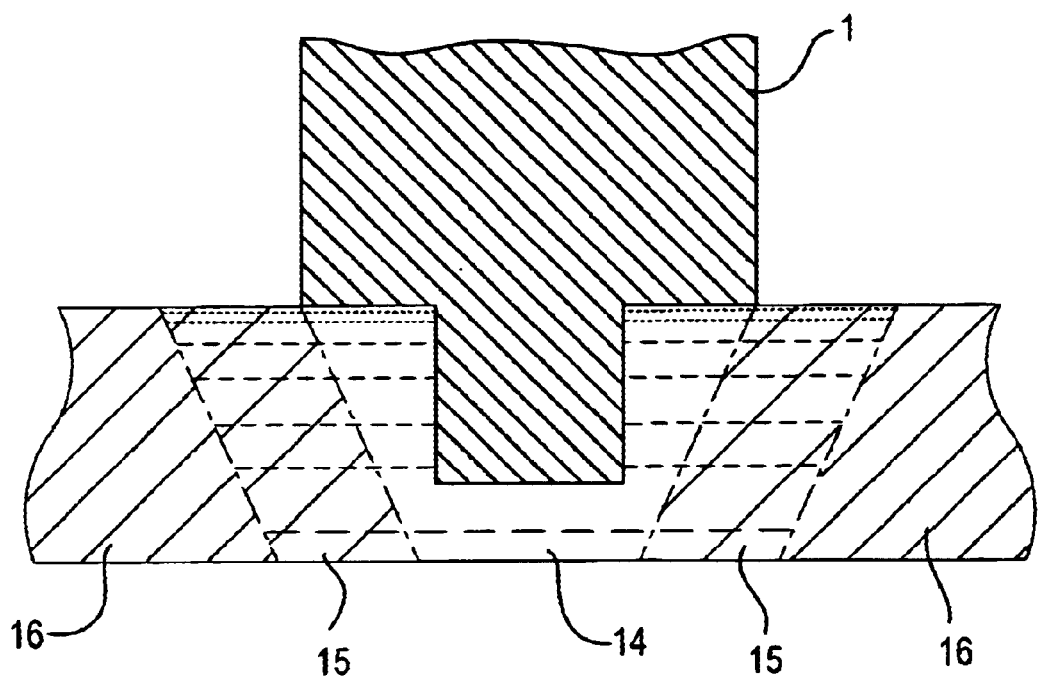
FIG. 3 schematically shows the different material zones during friction stir welding.

The material zones during friction stir welding schematically shown in FIG. 3 are the thermomechanically deformed zone 14, the heat-affected zone (HAZ) 15 and the base material 16. After the weld seam has cooled, usually the unwanted reduction in strength remains in the area of the heat-affected zone at both sides of the weld seam.

When using the solution according to the present invention for metal sheets of the alloys AA6013-T4 and AA6013-T6, this reduction in strength could be markedly reduced. The thickness of the metal sheets was around 4 mm and the ratio of the rotational speed to the feed rate of pin tool 1 was 3.5 rpm/mm, but can be varied within limits of approximately 1 rpm/mm to approximately 10 rpm/mm, as needed.

When combining the friction stir welding according to the present invention with a preceding laser beam heating, which would be impossible to accomplish with conventional cooling in a water bath, the heat produced by friction during friction stir welding can be further increased in a controlled manner by the laser beam heating, thus allowing the heating of the welding location to be adjusted to achieve an optimum weld. To this end, the laser beam source is rigidly connected to the pin tool at a certain distance of, for example, about 2 to 3 cm in front of it in the feed direction.

The same arrangement as above described for the laser beam heating, is accomplished when combining the friction stir welding according to the present invention with a preceding laser beam welding process, in which case, instead of the laser beam source for heating, a laser beam source for welding is rigidly connected to the pin tool. In this case, using the preceding laser beam welding process, a first weld is laid on which a second weld is laid by the subsequent friction stir welding process.

As an alternative to the above-described use of cooling water and cooling air, it is also possible to use a different water-containing coolant and a different gas for the cooling by cooling ring 2 and gas jet 3 according to the present invention. To this end, all cooling liquids and inert gases known in welding technology are applicable.

What is claimed is:

1. A method for friction stir welding using liquid cooling, the method comprising:
   moving a pin tool across a welding location;
   spraying a cooling liquid in a localized manner from a cooling ring moving with the pin tool onto a trailing region and onto lateral regions of the welding location adjacent to the pin tool; and
   blowing cooling gas from a gas jet moving with the pin tool from a front of the pin tool against the pin tool and against the cooling liquid emerging from the cooling ring.

2. The method for friction stir welding as recited in claim 1 wherein the cooling liquid includes water and the cooling gas includes air.

3. The method for friction stir welding as recited in claim 1 wherein the moving of the pin tool includes moving the pin tool at a feed rate, mid wherein pin tool rotates at a rotational speed so that a ratio of the rotational speed to the feed rate is in the range at a approximately 1 rpm/mm to approximately 10 rpm/mm.

4. The method for friction stir welding as recited in claim 3, wherein a material at the welding location includes Al/Mg.

5. The method for friction stir welding as recited in claim 1 further comprising heating the welding location using laser beam preceding the pin tool.

6. The method for friction stir welding as recited in claim 1 further comprising performing welding process to the welding location using a laser beam preceding the pin tool.

7. A friction stir welding and cooling device, comprising:
   a pin tool configured to move across a welding location; and
   a cooling ring at least partially encircling the pin tool and configured to move simultaneously with the pin tool across the welding location, the cooling ring including a plurality of nozzles configured to spray a cooling liquid and arranged such that the cooling liquid emerging from the nozzles is localized at a trailing region and at lateral regions of the welding location adjacent the pin tool.

8. The device as recited in claim 7 further comprising a gas jet disposed at the front of the pin tool and configured to blow a cooling gas against the pin tool and against the cooling liquid emerging from the nozzles.

9. The device as recited in claim 8 wherein the cooling ring is open toward the front of the pin tool so that gas jet can blow cooling gas from the front against the pin tool in an unhindered manner.

* * * * *